United States Patent
Suzuki (10) Patent No.: US 8,755,962 B2
(45) Date of Patent: Jun. 17, 2014

(54) ENGINE START CONTROL DEVICE FOR HYBRID VEHICLES

(75) Inventor: Hiroyuki Suzuki, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 341 days.

(21) Appl. No.: 13/411,923

(22) Filed: Mar. 5, 2012

(65) Prior Publication Data

US 2012/0316715 A1 Dec. 13, 2012

(30) Foreign Application Priority Data

Jun. 7, 2011 (JP) .................................. 2011-126881

(51) Int. Cl.
*B60L 9/00* (2006.01)
(52) U.S. Cl.
USPC ...................... 701/22; 180/65.265; 180/65.28; 701/54; 701/84; 701/90; 701/113; 903/930
(58) Field of Classification Search
USPC ............ 180/65.265; 80/65.28; 701/22; 903/9
See application file for complete search history.

(56) References Cited

U.S. PATENT DOCUMENTS

| 7,552,793 | B2* | 6/2009 | Okuda et al. ................... 180/293 |
| 7,559,388 | B2* | 7/2009 | Severinsky et al. ......... 180/65.28 |
| 8,010,247 | B2* | 8/2011 | Heap et al. ....................... 701/22 |
| 2008/0083579 | A1* | 4/2008 | Okuda et al. ................... 180/293 |
| 2012/0316715 | A1* | 12/2012 | Suzuki ............................ 701/22 |

FOREIGN PATENT DOCUMENTS

JP 2010-179865 A 8/2010

* cited by examiner

*Primary Examiner* — Redhwan k Mawari
(74) *Attorney, Agent, or Firm* — Young Basile (57) ABSTRACT

If a vehicle speed VSP during EV travel is lower than a predetermined speed VSP_s and hence is in a low vehicle speed range available for motor travel by a motor/generator, engine start control using a first engine start system with the motor/generator is executed. If the vehicle speed VSP during the EV travel is the predetermined speed VSP_s or higher and hence is in a vehicle speed range unavailable for the motor travel with the motor/generator, engine start control using a second engine start system with a starter motor is executed instead of the first engine start system with the motor/generator. Accordingly, the motor/generator does not have to cover an engine start torque when VSP≥VSP_s. A vehicle speed range available for the motor travel expands by the amount corresponding to the engine start torque, and fuel efficiency can be improved.

4 Claims, 5 Drawing Sheets

ENGINE START CONTROL DEVICE FOR HYBRID VEHICLES

CROSS-REFERENCE TO RELATED APPLICATION

This application claims priority from Japanese patent application serial no. JP2011-126881, filed Jun. 7, 2011, which is incorporated herein in its entirety by reference.

TECHNICAL FIELD

The present invention relates in general to an engine start control device for a hybrid vehicle that includes an engine, a first clutch, a motor/generator, a second clutch, and driving wheels arranged in order of a transmission path and can select electric travel only with the motor/generator or hybrid travel with the cooperation of the engine and the motor/generator, through engaging and disengaging control of the first and second clutches.

BACKGROUND

There is known, as the above-described hybrid vehicle, a one-motor two-clutch parallel hybrid vehicle, for example, described in Japanese Unexamined Patent Application Publication No. 2010-179865. In this hybrid vehicle, a motor/generator is coupled and arranged between an engine and driving wheels, a first clutch can connect and disconnect the engine with and from the motor/generator, and a second clutch can connect and disconnect the motor/generator with and from the driving wheels.

This hybrid vehicle can select an EV mode for electric (EV) travel with the motor/generator if the first clutch is disengaged and the second clutch is engaged, and a HEV mode for hybrid (HEV) travel with the cooperation of the motor/generator and the engine if both the first and second clutches are engaged.

In the one-motor two-clutch parallel hybrid vehicle, if a request driving force is increased, for example, because an accelerator pedal is depressed during travel in the EV mode that is selected in a small-load and low-rotation-speed situation and the request driving force is no longer provided only by the motor/generator, the mode is changed to the HEV travel (the HEV mode) with the cooperation of the motor/generator and the engine.

To start the engine for changing the mode from the EV mode to the HEV mode, the first clutch, which is in the disengaged state in the EV mode, is engaged, and the engine is started by a motor torque from the motor/generator. However, to ensure start-up of the engine as described in Japanese Unexamined Patent Application Publication No. 2010-179865, the rated torque of the motor/generator has to cover an electric (EV) travel torque part that is the sum of a driving torque part corresponding to a running resistance (an air resistance, a rolling resistance, etc.) of the vehicle and an acceleration torque margin part corresponding to a predetermined acceleration margin part of the vehicle, and an engine start torque (cranking torque) part.

Meanwhile, the motor/generator is desired to have a rated torque as small as possible and is desired to be downsized in view of the cost and mounting space of the motor/generator. Thus, the amplitude of the rated torque is restricted. However, although the rated torque of the motor/generator is restricted, the required acceleration torque margin part and engine start torque part are almost determined, and these margin part and torque part cannot be decreased. Hence, the driving torque part obtained by subtracting the acceleration torque margin part and engine start torque part from the rated torque of the motor/generator becomes small.

If the driving torque part becomes small, the travel in the EV mode only with the motor/generator becomes unavailable at an early timing (even at a low vehicle speed) because of insufficiency of the torque. Thus, the mode has to be changed to the HEV mode with the cooperation of the engine and the motor/generator at an early timing (even at a low vehicle speed). This may narrow an EV mode range that provides an improvement in specific fuel consumption. Hence, fuel efficiency of the vehicle may be degraded.

BRIEF SUMMARY

In the case of the one-motor two-clutch parallel hybrid vehicle, in addition to a first engine start system that starts the engine with the motor/generator, a second engine start system that starts the engine with a dedicated starter motor is provided in view of engine startability at low temperatures. The second engine start system is advantageous for starting the engine at low temperatures; however, the starter motor is less frequently used in normal situations and is not effectively used. Hence, an object of the present invention is to provide an engine start control device for a hybrid vehicle that addresses the problem relating to the fuel efficiency (i.e., the problem in which the EV mode range is narrowed) by effectively using the second engine start system.

To attain the object, an engine start control device for a hybrid vehicle according to an aspect of the present invention has the following configuration.

First, describing the hybrid vehicle serving as a precondition, the hybrid vehicle includes an engine, a first clutch, a motor/generator, a second clutch, and driving wheels arranged in order of a transmission path and can select electric travel only with the motor/generator from among the engine and the motor/generator or hybrid travel with the cooperation of the engine and the motor/generator, through engaging and disengaging control of the first and second clutches. The engine start control device used for the hybrid vehicle and serving as a precondition includes a first engine start system that engages the first clutch and starts the engine with the motor/generator; and a second engine start system that starts the engine with a starter motor for starting the engine.

Then, the aspect of the present invention has a feature that the engine start control device includes an engine start system selecting unit.

The engine start system selecting unit selects the first engine start system or the second engine start system so that, based on rotation speed information relating to the electric travel, engine start control using the first engine start system is executed if the rotation speed information is lower than a predetermined speed and engine start control using the second engine start system is executed if the rotation speed information is the predetermined speed or higher.

With the engine start control device for the hybrid vehicle according to the aspect of the present invention, the engine start control using the first engine start system is executed if the rotation speed information relating to the electric travel is lower than the predetermined speed, and the engine start control using the second engine start system is executed if the rotation speed information relating to the electric travel is the predetermined speed or higher. Accordingly, the following advantage can be attained.

If only the engine start control using the first engine start system is executed, since the rated torque of the motor/generator is restricted, the electric travel only with the motor/ generator becomes unavailable at an early timing (even at a low rotation speed) because of insufficiency of the driving torque of the motor/generator as described above, and the mode has to be changed to the hybrid travel with the cooperation of the engine and the motor/generator at an early timing (even at a low rotation speed). The electric travel range is narrowed and the fuel efficiency is degraded.

However, with the aspect of the present invention, the engine start control using the second engine start system is executed if the rotation speed information relating to the electric travel is the predetermined speed or higher. The restricted rated torque of the motor/generator does not have to cover the engine start toque part during the engine start control using the second engine start system. Occurrence of insufficiency of the driving torque of the motor/generator can be delayed by the amount corresponding to the engine start torque part. The electric travel only with the motor/generator can be continued until its rotation speed reaches a higher rotation speed. Accordingly, the electric travel range can expand, and the fuel efficiency can be improved.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
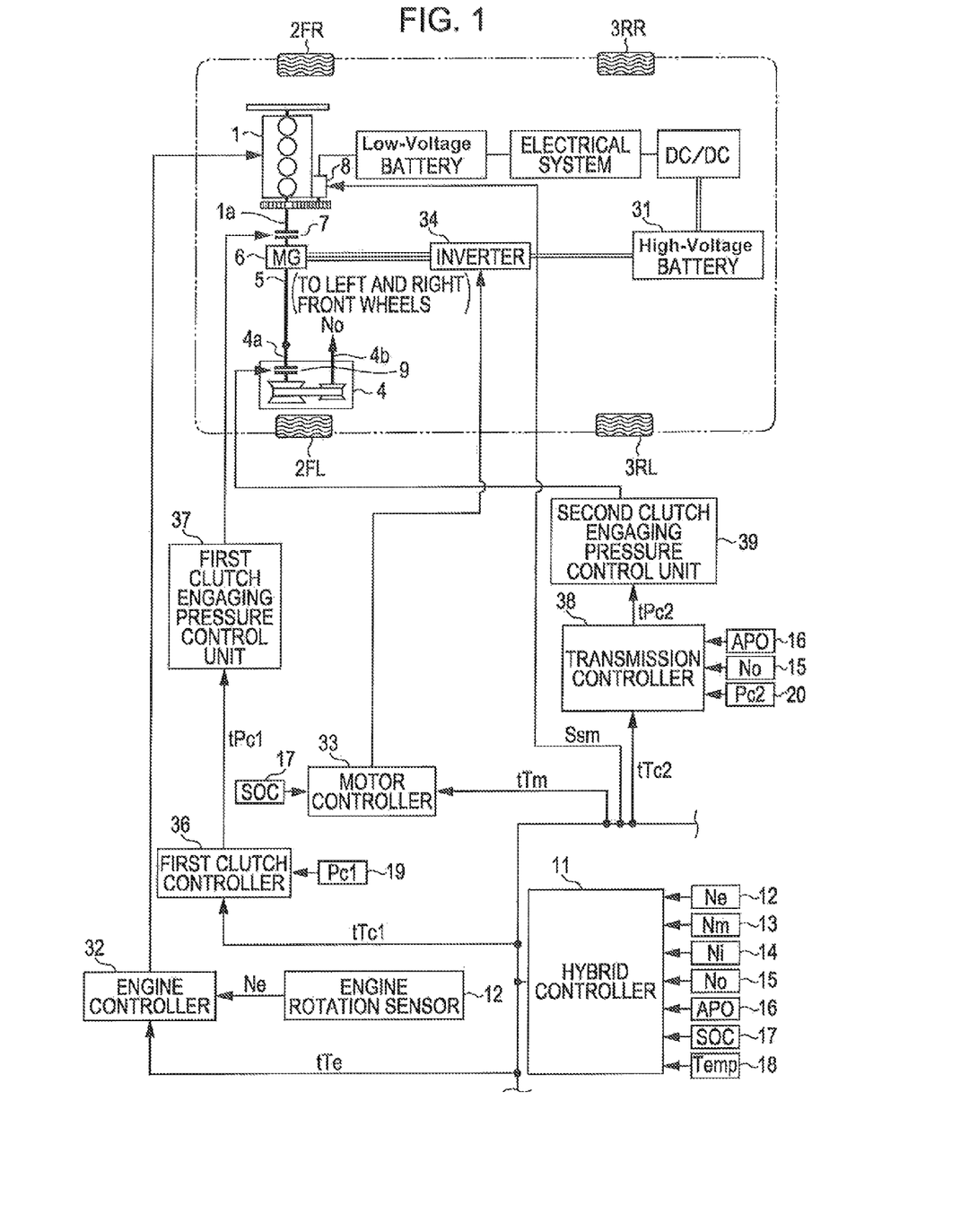
FIG. 1 is a schematic system diagram showing a power train and a control system of a hybrid vehicle including an engine start control device according to an embodiment of the present invention.

FIG. 1 illustrates a power train and a control system of a hybrid vehicle including an engine start control device according to an embodiment of the present invention. This hybrid vehicle is formed by using a front-engine front-wheel drive car (a front-wheel drive car) as a base vehicle and configuring the vehicle as a hybrid vehicle. Referring to FIG. 1, reference sign 1 denotes an engine serving as a power source, 2FL and 2FR respectively denote left and right front wheels (left and right driving wheels), and 3RL and 3RR respectively denotes left and right rear wheels (left and right driven wheels).

In the power train of the hybrid vehicle shown in FIG. 1, a V-belt continuously variable transmission 4 is arranged at one side in a vehicle width direction of the engine 1 that is transversely mounted like a typical front-wheel drive car. A motor/generator 6 (MG, a power source) is coupled with a shaft 5 that transmits rotation from the engine 1 (more particularly, a crank shaft 1a) to an input shaft 4a of the V-belt continuously variable transmission 4.

The motor/generator 6 includes a ring-like stator fixed in a housing and a rotor arranged in the stator coaxially with the stator with a predetermined air gap interposed there between. The motor/generator 6 acts as an electric motor (a motor) or a generator (a power generator) in accordance with a request of a driving state, and is arranged between the engine 1 and the V-belt continuously variable transmission 4. The motor/generator 6 penetrates through the shaft 5 and is coupled with the center of the rotor. The motor/generator 6 uses the shaft 5 as a motor/generator shaft.

A first clutch 7 is arranged between the motor/generator 6 and the engine 1, and more particularly between the motor/generator shaft 5 and an engine crank shaft 1a. The first clutch 7 can connect and disconnect the engine 1 with and from the motor/generator 6. The first clutch 7 can continuously change a transmission torque (clutch engaging) capacity. For example, the first clutch 7 is a wet multi-disk clutch that can change the transmission torque (clutch engaging) capacity by continuously controlling a clutch hydraulic fluid amount and a clutch hydraulic fluid pressure by a proportional solenoid.

The motor/generator 6 and the V-belt continuously variable transmission 4 are directly coupled with each other through direct coupling between the motor/generator shaft 5 and the transmission input shaft 4a. A second clutch 9 is arranged in the middle of the transmission input shaft 4a.

While the V-belt continuously variable transmission 4 may be a typical continuously variable transmission, a torque converter is removed from the continuously variable transmission and the motor/generator 6 is directly coupled with the transmission input shaft 4a. If the transmission input shaft 4a is in an engaged state, the speed of rotation from the input shaft 4a is changed with a speed reduction ratio corresponding to a pulley ratio of the V-belt continuously variable transmission mechanism, and the result rotation is output to an output shaft 4b.

The rotation output from the output shaft 4b of the V-belt continuously variable transmission 4 is transmitted to the left and right front wheels 2FL and 2FR through a differential gear device (not shown), and is used for travel of the vehicle. It is to be noted that the V-belt continuously variable transmission 4 may be alternatively a stepped automatic transmission.

Also, the second clutch 9 that connects and disconnects the motor/generator 6 with and from the driving wheels 2FL and 2FR and that is necessary for the hybrid vehicle may be arranged downstream of the V-belt continuously variable transmission 4 instead of being arranged in the middle of the transmission input shaft 4a as shown in FIG. 1. It is to be noted that the second clutch 9 may continuously change a transmission torque capacity (a clutch engaging capacity) like the first clutch 7.

Travel modes of the power train described above with reference to FIG. 1 are described below.

In the power train shown in FIG. 1, if electric travel (EV mode) used in a small-load and low-vehicle-speed situation such as start-up from a stopped state is requested, the first clutch 7 is disengaged and the second clutch 9 is engaged. If the motor/generator 6 is driven in this state, only output rotation from the motor/generator 6 reaches the transmission input shaft 4a. Then, the V-belt continuously variable transmission 4 changes the speed of rotation to the input shaft 4a in accordance with a selected pulley ratio and outputs the result rotation from the transmission output shaft 4b.

The rotation from the transmission output shaft 4b reaches the front wheels 2FL and 2FR through the differential gear device (not shown), so that the vehicle travels by electric travel (EV travel) only with the motor/generator 6.

If hybrid travel (HEV mode) used during, for example, high-speed travel or large-load travel is requested, the first clutch 7 is engaged and the second clutch 9 is engaged.

In this state, both the output rotation from the engine 1 and the output rotation from the motor/generator 6 reach the transmission input shaft 4a by the cooperation of the engine 1 and the motor/generator 6. The V-belt continuously variable transmission 4 changes the speed of rotation to the input shaft 4a in accordance with a selected pulley ratio, and outputs the result rotation from the transmission output shaft 4b.

The rotation from the transmission output shaft 4b reaches the front wheels 2FL and 2FR through the differential gear device (not shown), so that the vehicle travels by hybrid travel (HEV travel) with the cooperation of the engine 1 and the motor/generator 6.

During the HEV travel, if the amount of energy is excessive when the engine 1 is operated with an optimal fuel efficiency, the excessive energy is converted into electric power such that the motor/generator 6 acts as a generator by using the excessive energy. The generated electric power is charged to be used for motor driving of the motor/generator 6. Accordingly, the fuel efficiency of the engine 1 can be improved.

The EV mode or the HEV mode is generally selected as follows.

Selection of the EV mode in which the electric (EV) travel is provided only by the motor/generator 6 is commanded if the vehicle speed is a predetermined vehicle speed (for example, 30 km/h) or lower, the accelerator pedal opening is a predetermined opening (for example, ⅛) or smaller or the rate of change in accelerator pedal opening is a predetermined acceleration request (for example, 0.05 G) or smaller, the motor/generator rotation speed is a predetermined motor rotation speed (for example, 1000 rpm) or smaller, the engine cooling water temperature is a predetermined water temperature (for example, 40° C.) or higher, and the battery state of charge (SOC) is a predetermined state of charge (for example, 60%) or more.

If even one of the EV-mode selection conditions is not satisfied, i.e., for example, if the accelerator pedal opening exceeds the predetermined opening (⅛) or the rate of change in accelerator pedal opening exceeds the predetermined acceleration request (0.05 G) because of depression of the accelerator pedal during the EV travel, or if the battery state of charge SOC is less than the predetermined state of charge (60%), selection of the HEV mode in which the hybrid (HEV) travel is provided by the cooperation of the engine 1 and the motor/generator 6 is commanded.

Next, the control system for the engine 1, the motor/generator 6, the first clutch 7, and the second clutch 9 that form the power train of the hybrid vehicle is briefly described with reference to FIG. 1.

This control system includes a hybrid controller 11 that provides integrated control for operating points of the power train. The operating points of the power train are defined by a target engine torque tTe, a target motor/generator torque tTm, a target engaging capacity tTc1 of the first clutch 7 (a first clutch engaging pressure command value tPc1), and a target engaging capacity tTc2 of the second clutch 9 (a second clutch engaging pressure command value tPc2).

The hybrid controller 11 also generates a starter motor control signal Ssm that provides ON/OFF control for a starter motor 8 for starting the engine at low temperatures. The starter motor control signal Ssm is used for engine start control (described later) that is the aim of the present invention.

In order to determine the operating points of the power train and to generate an engine stop control signal, the hybrid controller 11 receives a signal from an engine rotation sensor 12 that detects an engine rotation speed Ne, a signal from a motor/generator rotation sensor 13 that detects a motor/generator rotation speed Nm, a signal from an input rotation sensor 14 that detects a transmission input rotation speed Ni, a signal from an output rotation sensor 15 that detects a transmission output rotation speed No (a vehicle speed VSP), a signal from an accelerator pedal opening sensor 16 that detects a depressed amount of the accelerator pedal (an accelerator pedal opening APO), a signal from a charge state sensor 17 that detects a battery state of charge SOC of a high-voltage battery 31 that charges electric power for the motor/generator 6, and a signal from an engine cooling water temperature sensor 18 that detects an engine cooling water temperature Temp.

The hybrid controller 11 selects a drive mode (the EV mode, the HEV mode) that can provide a driving force of the vehicle desired by a driver, and calculates the target engine torque tTe, the target motor/generator torque tTm, the first clutch target engaging capacity tTc1, and the second clutch target engaging capacity tTc2, by using the accelerator pedal opening APO, the battery state of charge SOC, and the transmission output rotation speed No (the vehicle speed VSP) from among the aforementioned input information.

The target engine torque tTe is fed to an engine controller 32. The engine controller 32 controls the engine 1 such that the engine torque becomes the target engine torque tTe by using the engine rotation speed Ne detected by the sensor 12 and the target engine torque tTe, through throttle opening control or fuel-injection amount control for achieving the target engine torque tTe based on the engine rotation speed Ne.

The target motor/generator torque tTm is fed to a motor controller 33. The motor controller 33 converts electric power of the high-voltage battery 31 through DC/AC conversion by an inverter 34, feeds the electric power to the stator of the motor/generator 6 under the control of the inverter 34, and controls the motor/generator 6 such that the motor/generator torque meets the target motor/generator torque tTm.

If the target motor/generator torque tTm is a value that requests the motor/generator 6 to execute regenerative braking, the motor controller 33 gives a power generation load, which prevents the high-voltage battery 31 from being overcharged, to the motor/generator 6 in accordance with the battery state of charge SOC detected by the sensor 17, through the inverter 34. The motor controller 33 converts the electric power generated by the motor/generator 6 through the regenerative braking, through AC/DC conversion by the inverter 34, and the electric power is charged in the high-voltage battery 31.

The first clutch target engaging capacity tTc1 is fed to a first clutch controller 36. The first clutch controller 36 executes engaging capacity control for the first clutch 7 by controlling the engaging pressure of the first clutch 7 through a first clutch engaging pressure control unit 37 so that an engaging pressure Pc1 of the first clutch 7 detected by a sensor 19 becomes the first clutch engaging pressure command value tPc1 through comparison between the first clutch engaging pressure command value tPc1 corresponding to the first clutch target engaging capacity tTc1 and the engaging pressure Pct of the first clutch 7.

The second clutch target engaging capacity tTc2 is fed to a transmission controller 38. The transmission controller 38 executes engaging capacity control for the second clutch 9 by controlling the engaging pressure of the second clutch 9 through a second clutch engaging pressure control unit 39 so that an engaging pressure Pc2 of the second clutch 9 detected by a sensor 20 becomes the second clutch engaging pressure command value tPc2 through comparison between the second clutch engaging pressure command value tPc2 corresponding to the second clutch target engaging capacity tTc2 and the engaging pressure Pc2 of the second clutch 9.

The transmission controller 38 obtains a pulley ratio optimal to the current driving state based on the transmission output rotation speed No (the vehicle speed VSP) detected by the sensor 15 and the accelerator pedal opening APO detected by the sensor 16 with reference to a predetermined speed change map, and the transmission controller 38 continuously changes the speed from the current pulley ratio to the optimal pulley ratio.

The brief explanation for the normal control executed by the control system in FIG. 1 is provided above.

In this embodiment, the engine start control that is the aim of the present invention is executed as described below such that the hybrid controller 11 in FIG. 1 executes an engine start control program shown in FIG. 2.

Start-up of the engine includes a method using a first engine start system that starts the engine by engaging the first clutch 7 and cranking the engine 1 by the motor/generator 6, and a method using a second engine start system that starts the engine such that the starter motor 8 cranks the engine 1 with electric power from a low-voltage battery. The second engine start system using the starter motor 8 is installed for independently starting combustion of the engine 1 in order to ensure engine startability at low temperatures.

Figure 2:
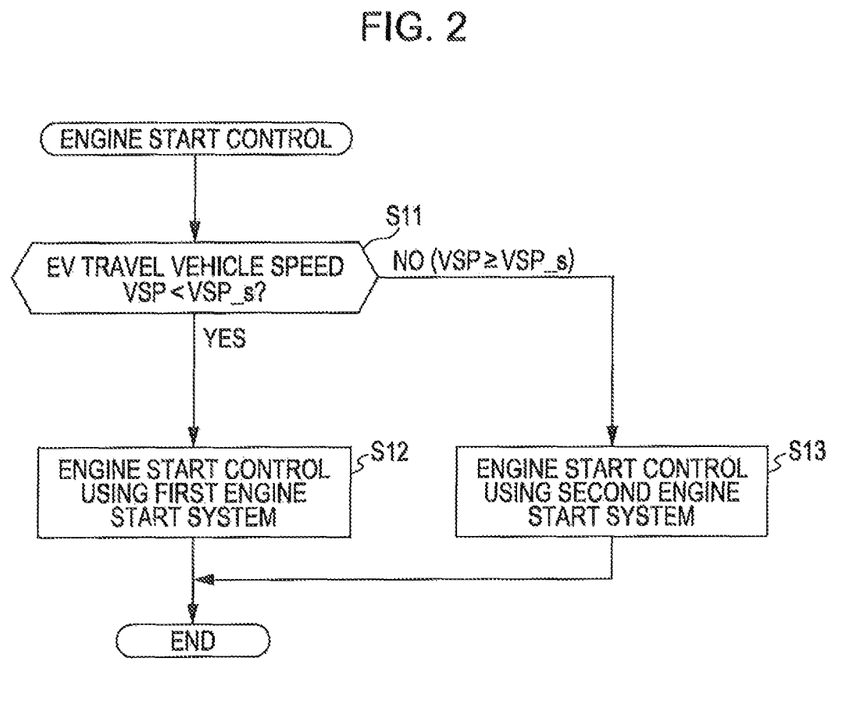
FIG. 2 is a flowchart showing an engine start control program executed by a hybrid controller of the power train control system shown in FIG. 1.

The engine start control program in FIG. 2 is executed in a situation other than the situation at low temperatures that needs to ensure the engine startability. In step S11, it is checked whether or not the vehicle speed VSP during the EV travel while the engine 1 is stopped is a vehicle speed lower than a predetermined vehicle speed VSP_s.

Now, the predetermined vehicle speed VSP_s is described.

Figure 3:
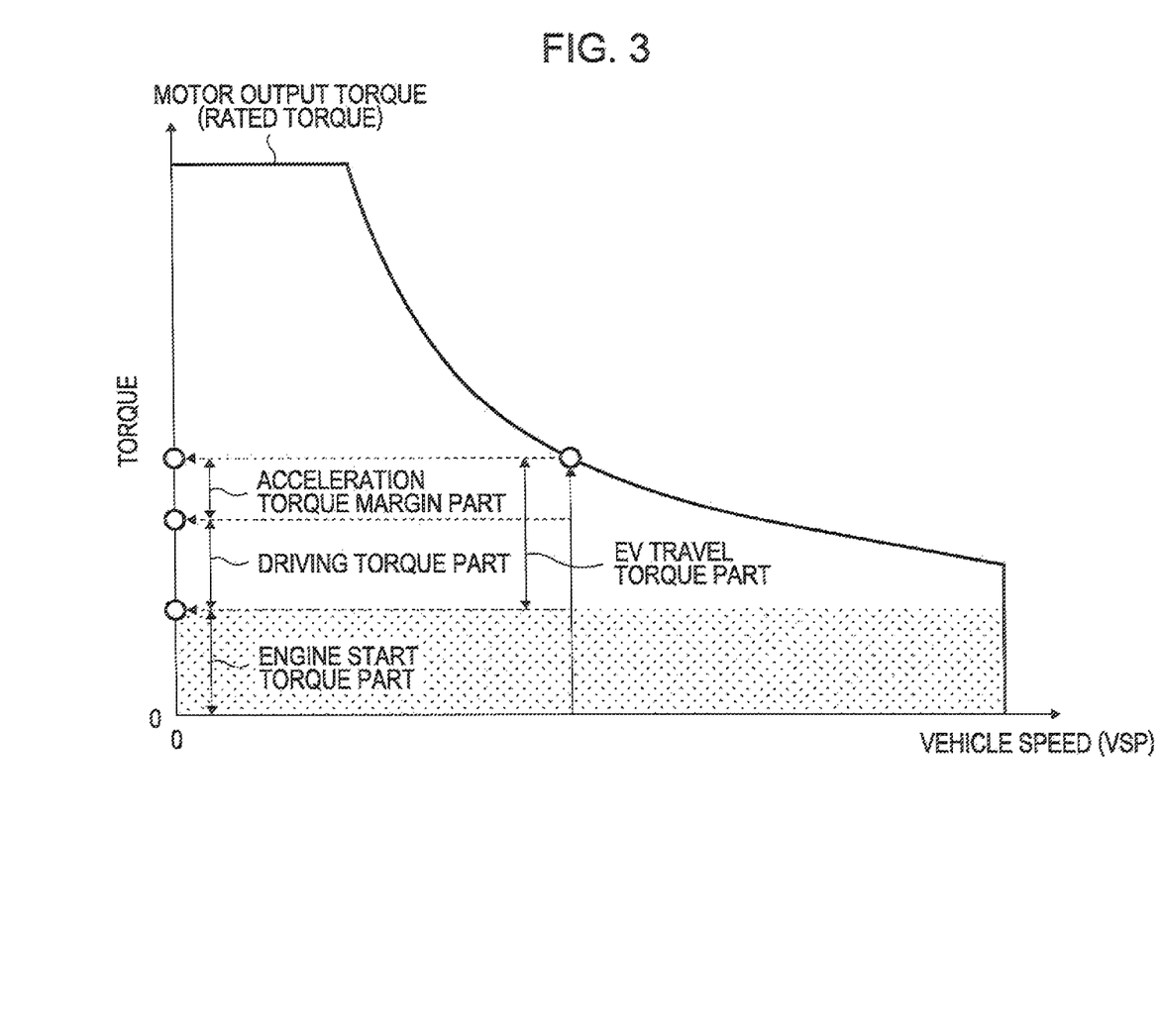
FIG. 3 is a graph used for explaining a procedure when a motor output torque (a rated torque) of a motor/generator shown in FIG. 1 is determined.

To allow the motor/generator 6 serving as the first engine start system to start the engine 1 as described above, the motor output torque (the rated torque) of the motor/generator 6 that varies as exemplary shown in FIG. 3 with respect to the vehicle speed VSP (the motor/generator rotation speed Nm) has to have the amplitude that covers an electric (EV) travel torque part that is the sum of a driving torque part corresponding to a running resistance (air resistance, rolling resistance, etc.) of the vehicle and an acceleration torque margin part corresponding to a predetermined acceleration margin part of the vehicle, and the engine start torque (cranking torque) part.

Meanwhile, the motor/generator 6 is desired to have the motor output torque (the rated torque) as small as possible and is desired to be downsized in view of the cost and mounting space of the motor/generator 6. The amplitude of the motor output torque (the rated torque) is restricted.

However, although the motor output torque (the rated torque) of the motor/generator 6 is restricted, the required acceleration torque margin part and the engine start torque part are almost determined, and these margin part and torque part cannot be decreased. Hence, the driving torque part obtained by subtracting the acceleration torque margin part and engine start torque part from the rated torque of the motor/generator becomes small.

If the driving torque part becomes small, the travel in the EV mode only with the motor/generator 6 becomes unavailable at an early timing (even at a low vehicle speed) because of insufficiency of the torque. Thus, the mode has to be changed to the HEV mode with the cooperation of the engine 1 and the motor/generator 6 at an early timing (even at a low vehicle speed).

This may narrow an EV mode range that provides an improvement in specific fuel consumption. Hence, the fuel efficiency of the vehicle may be degraded.

Figure 4:
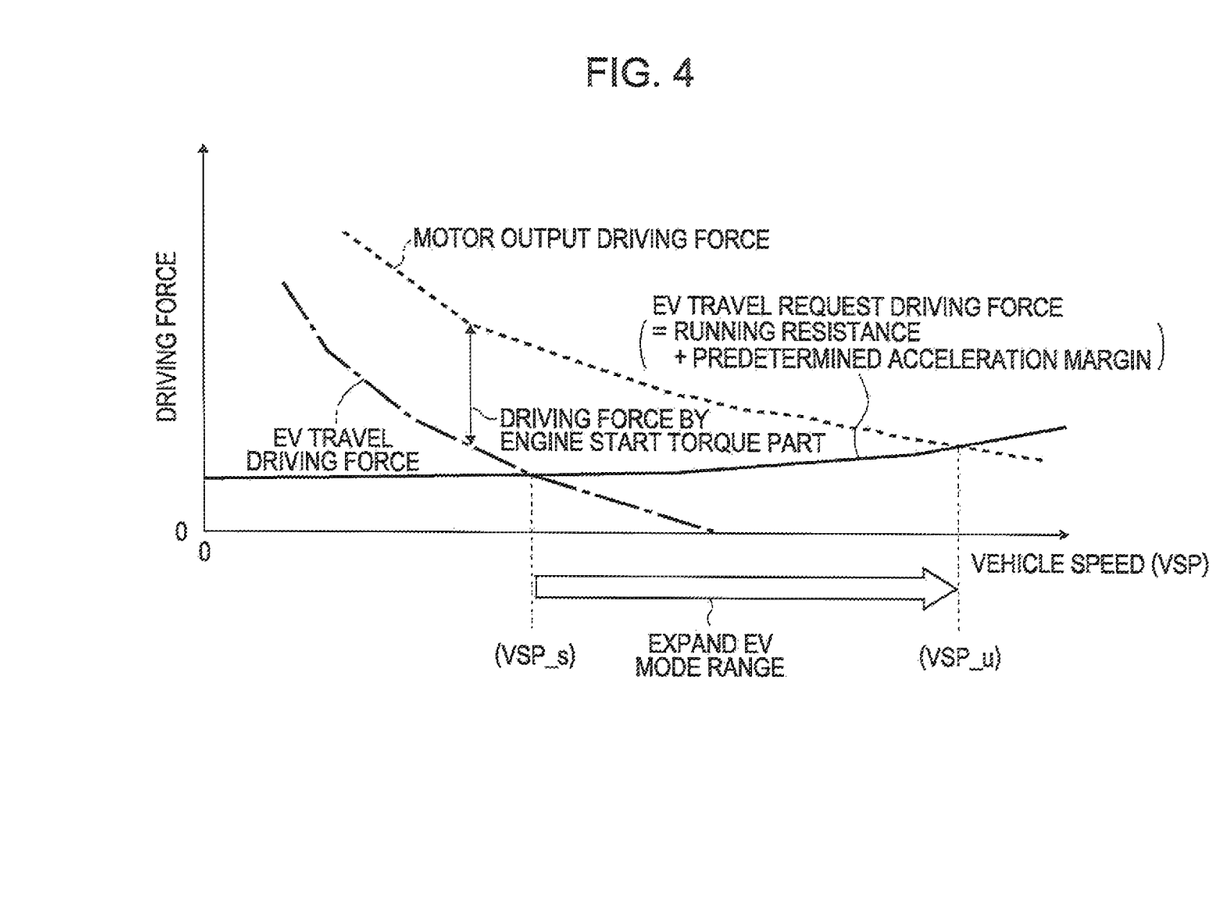
FIG. 4 is a graph showing a motor output driving force by the motor output torque (the rated torque) shown in FIG. 3 together with an EV travel driving force provided by the motor/generator for EV travel and an EV travel request driving force.

Referring to FIG. 4, the broken line plots a motor output driving force that is a value obtained by converting the motor output torque (the rated torque) in FIG. 3 into a driving force, the dotted chain line plots an EV travel driving force obtained by subtracting the driving force of the engine start torque part in FIG. 3 from the motor output driving force (a value obtained by converting the EV travel torque part shown in FIG. 3 into a driving force), and the solid line plots an EV travel request driving force (the sum of the running resistance and the predetermined acceleration margin part).

If the engine is started by using the first engine start system (the motor/generator 6), when the vehicle speed VSP during the EV travel becomes VSP_s in FIG. 4 or higher, the EV travel driving force (the dotted chain line) of the motor/generator 6 used for the EV travel becomes smaller than the EV travel request driving force (the solid line), and the EV travel only with the motor/generator 6 becomes unavailable because of insufficiency of the driving torque of the motor/generator 6.

Hence, if the vehicle speed VSP during the EV travel becomes VSP≥VSP_s, the mode has to be changed to the HEV travel mode with the cooperation of the engine 1 and the motor/generator 6. This may narrow the EV mode range that provides an improvement in specific fuel consumption. Hence, the fuel efficiency of the vehicle may be degraded.

Owing to this, in this embodiment, the predetermined vehicle speed VSP_s used in step S11 is determined as a vehicle speed value denoted by the same reference sign in FIG. 4.

In step S11, if it is determined that the vehicle speed VSP during the EV travel is a vehicle speed lower than the predetermined vehicle speed VSP_s (see FIG. 4), the engine start control using the first engine start system is executed in step S12.

When the engine start control using the first engine start system is executed, the presence of an engine start request is checked by checking the presence of a mode change request from the EV mode to the HEV mode, and if the engine start request is generated, the engine is started by using the first engine start system (the motor/generator 6) such that the target engaging capacity tTc1 of the first clutch 7 in FIG. 1 is set to the predetermined capacity with which the first clutch 7 is engaged or larger and the target motor torque tTm is set to the motor torque value with which the engine 1 can be cranked or larger. Hence, steps S11 and S12 correspond to an engine start system selecting unit according to an aspect of the present invention.

Meanwhile, if the vehicle speed VSP during the EV travel is a low vehicle speed of VSP<VSP_s, even if the motor/generator 6 is used for starting the engine, the EV travel driving force (the dotted chain line in FIG. 4) of the motor/generator 6 used for the EV travel is equal to or larger than the EV travel request driving force (the solid line in FIG. 4). The EV travel only with the motor/generator 6 is available, and the above-mentioned problem relating to the degradation in fuel efficiency does not occur.

Therefore, if the vehicle speed VSP during the EV travel is in the vehicle speed range of VSP≥VSP_s, when the motor/generator 6 is used for starting the engine, the EV travel driving force (the dotted chain line in FIG. 4) of the motor/generator 6 used for the EV travel is smaller than the EV travel request driving force (the solid line in FIG. 4). The EV travel only with the motor/generator 6 is not available because of insufficiency of the driving force. The mode has to be changed to the HEV travel with the cooperation of the engine 1 and the motor/generator 6. This may narrow the EV mode range that provides an improvement in specific fuel consumption. Hence, the fuel efficiency of the vehicle may be degraded.

Owing to this, according to this embodiment, if the vehicle speed VSP during the EV travel is in a vehicle speed range of VSP≥VSP_s (step S11), the control goes to step S13, and the engine start control is executed as follows by effectively using the second engine start system (the starter motor 8) that is used when the engine is started at low temperatures but is rarely used in other situations.

In step S13, the presence of the engine start request is checked by checking the presence of the mode change request from the EV mode to the HEV mode, and if the engine start request is generated, the starter motor control signal Ssm in FIG. 1 is set to Ssm=ON, to drive the starter motor 8. Thus, the engine is started by using the second engine start system (the starter motor 8). Hence, steps S11 and S13 correspond to an engine start system selecting unit according to an aspect of the present invention.

As described above, if the vehicle speed VSP during the EV travel is in the vehicle speed range of VSP≥VSP_s (step S11), if the engine 1 is started by using the second engine start system (the starter motor 8) for starting the engine at low temperatures (S13), the restricted rated torque of the motor/generator 6 does not have to cover the engine start torque part. In the vehicle speed range of VSP≥VSP_s in FIG. 4, the motor output driving force of the motor/generator 6 indicated by the broken line in the same drawing can be entirely used as the EV travel driving force.

Accordingly, the EV travel only with the motor/generator 6 is available until the vehicle speed VSP reaches a vehicle speed VSP_u at which the motor output driving force indicated by the broken line in FIG. 4 becomes smaller than the EV travel request driving force indicated by the solid line. The timing at which the mode is changed to the HEV travel with the cooperation of the engine 1 and the motor/generator 6 can be delayed until the vehicle speed VSP reaches the vehicle speed VSP_u.

Figure 5:
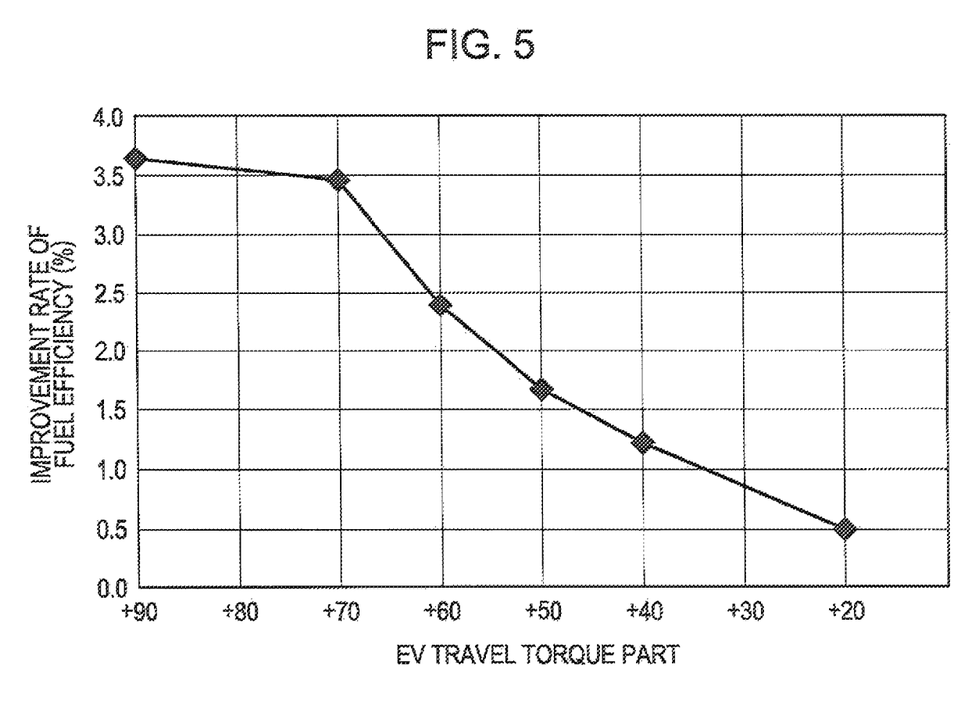
FIG. 5 is a graph showing a change characteristic of the improvement rate of fuel efficiency attained by engine start control shown in FIG. 2.

Accordingly, the EV mode range that provides an improvement in specific fuel consumption can expand from VSP_s to VSP_u as indicated by an arrow in FIG. 4. The fuel efficiency of the vehicle can be improved as shown in FIG. 5 by the amount corresponding to the expansion of the EV mode range.

With the engine start control of this embodiment with reference to FIG. 2, if the engine start request is generated in a vehicle speed range lower than the predetermined vehicle speed VSP_s in which the EV travel driving force of the motor/generator 6 indicated by the dotted chain line in FIG. 4 is larger than the EV travel request driving force indicated by the solid line in the same drawing (steps S11 and S12), the engine start control using the first engine start system (the motor/generator 6) is executed (step S12). If the vehicle speed VSP during the EV travel is the predetermined vehicle speed VSP_s or higher (steps S11 and S13), the engine start control using the second engine start system (the starter motor 8) is executed (step S13). Accordingly, if the vehicle speed VSP during the EV travel is in the vehicle speed range of VSP≥VSP_s, the restricted rated torque of the motor/generator 6 does not have to cover the engine start torque part, and the motor output driving force of the motor/generator 6 indicated by the broken line in FIG. 4 can be entirely used as the EV travel driving force.

Accordingly, the EV travel only with the motor/generator 6 is available until the vehicle speed VSP reaches the vehicle speed VSP_u at which the motor output driving force indicated by the broken line in FIG. 4 becomes smaller than the EV travel request driving force indicated by the solid line. The change of mode to the HEV travel with the cooperation of the engine 1 and the motor/generator 6 can extend to the vehicle speed VSP_u. Hence, the EV mode range can expand from VSP_s to VSP_u as indicated by the arrow in FIG. 4. The fuel efficiency of the vehicle can be improved by the amount corresponding to the expansion of the EV mode range.

In the above-described embodiment, it is determined whether the engine start control using the first engine start system (the motor/generator 6) is executed or the engine start control using the second engine start system (the starter motor 8) is executed, depending on whether or not the vehicle speed VSP during the EV travel is lower than the predetermined vehicle speed VSP_s. Alternatively, it may be determined whether the engine start control using the first engine start system (the motor/generator 6) is executed or the engine start control using the second engine start system (the starter motor 8) is executed, depending on the motor/generator rotation speed Nm during the EV travel.

The motor/generator rotation speed Nm during the EV travel is used as rotation speed information during the EV travel instead of the vehicle speed VSP during the EV travel in order to crank the engine 1 with the motor rotation speed that can generate the rated torque of the motor/generator 6 if start-up of the engine employs the motor/generator 6 (the first engine start system).

In this case, the rotation speed that can generate the rated torque is determined as a predetermined rotation speed. If the motor/generator rotation speed Nm during the EV travel is smaller than the predetermined rotation speed (the rotation speed that can generate the rated torque), the engine start control using the first engine start system (the motor/generator 6) is executed, and if the motor/generator rotation speed Nm during the EV travel is the predetermined rotation speed (the rotation speed that can generate the rated torque) or larger, the engine start control using the second engine start system (the starter motor 8) is executed.

With this configuration, an advantage similar to that of the illustrated embodiment can be attained. The fuel efficiency can be improved by the expansion of the EV mode range that provides an improvement in fuel efficiency.

What is claimed is:

1. An engine start control device for a hybrid vehicle that includes an engine, a first clutch, a motor/generator, a second clutch, and driving wheels arranged in order of a transmission path and can select electric travel only with the motor/generator or hybrid travel with cooperation of the engine and the motor/generator, through engaging and disengaging control of the first and second clutches, the engine start control device comprising:

a first engine start system that engages the first clutch and starts the engine with the motor/generator;

a second engine start system that starts the engine with a starter motor; and an engine start system selecting unit that selects engine start control using the first engine start system if a rotation speed information relating to the electric travel is lower than a predetermined speed and engine start control using the second engine start system if the rotation speed information is the predetermined speed or higher, wherein:

the rotation speed information is a vehicle speed, and the predetermined vehicle speed is a vehicle speed when an electric travel driving force generated by an electric travel torque part obtained by subtracting an engine start torque part required for starting the engine from a rated torque of the motor/generator is smaller than a sum of a running resistance and a predetermined acceleration margin part of the vehicle.

2. A method of engine start control for a hybrid vehicle that includes an engine, a first clutch, a motor/generator, a second clutch, and driving wheels arranged in order of a transmission path and can select electric travel only with the motor/generator or hybrid travel with cooperation of the engine and the motor/generator, through engaging and disengaging control of the first and second clutches, the method comprising:
   determining if a rotation speed information during electric travel is lower than a predetermined speed; and
   executing a first engine start system that engages the first clutch and starts the engine with the motor/generator if the rotation speed information is lower than the predetermined speed; or
   executing a second engine start system that starts the engine with a starter motor for starting the engine if the rotation speed information is equal to or greater than the predetermined speed, wherein:
   the rotation speed information is a vehicle speed, and the predetermined vehicle speed is a vehicle speed when an electric travel driving force generated by an electric travel torque part obtained by subtracting an engine start torque part required for starting, the engine from a rated torque of the motor/generator is smaller than a sun of a running resistance and a predetermined acceleration margin part of the vehicle.

3. An engine start control device for a hybrid vehicle that includes an engine, a first clutch, a motor/generator, a second clutch, and driving wheels arranged in order of a transmission path and can select electric travel only with the motor/generator or hybrid travel with cooperation of the engine and the motor/generator, through engaging and disengaging control of the first and second clutches, the engine start control device comprising:
   a first engine start system that engages the first clutch and starts the engine with the motor/generator;
   a second engine start system that starts the engine with a starter motor; and
   an engine start system selecting unit that selects engine start control using the first engine start system if a rotation speed information relating to the electric travel is lower than a predetermined speed and engine start control using the second engine start system if the rotation speed information is the predetermined speed or higher, wherein
   the rotation speed information is a motor/generator rotation speed, and the predetermined speed is a motor/generator rotation speed that can generate the rated torque of the motor/generator that is determined to correspond to the sum of the engine start torque part required for starting the engine and the electric travel torque part.

4. A method of engine start control for a hybrid vehicle that includes an engine, a first clutch, a motor/generator, a second clutch, and driving wheels arranged in order of a transmission path and can select electric travel only with the motor/generator or hybrid travel with cooperation of the engine and the motor/generator, through engaging and disengaging control of the first and second clutches, the method comprising:
   determining if a rotation speed information during electric travel is lower than a predetermined speed; and
   executing a first engine start system that engages the first clutch and starts the engine with the motor/generator if the rotation speed information is lower than the predetermined speed; or
   executing a second engine start system that starts the engine with a starter motor for starting the engine if the rotation speed information is equal to or greater than the predetermined speed, wherein:
   the rotation speed information is a motor/generator rotation speed, and the predetermined speed is a motor/generator rotation speed that can generate the rated torque of the motor/generator that is determined to correspond to the sum of the engine start torque part required for starting the engine and the electric travel torque part.

* * * * *